April 29, 1958 — W. J. METZGER — 2,832,476
ALIGNMENT CONTROL MEANS FOR RAILWAY VEHICLES
Filed June 21, 1954 — 2 Sheets-Sheet 1
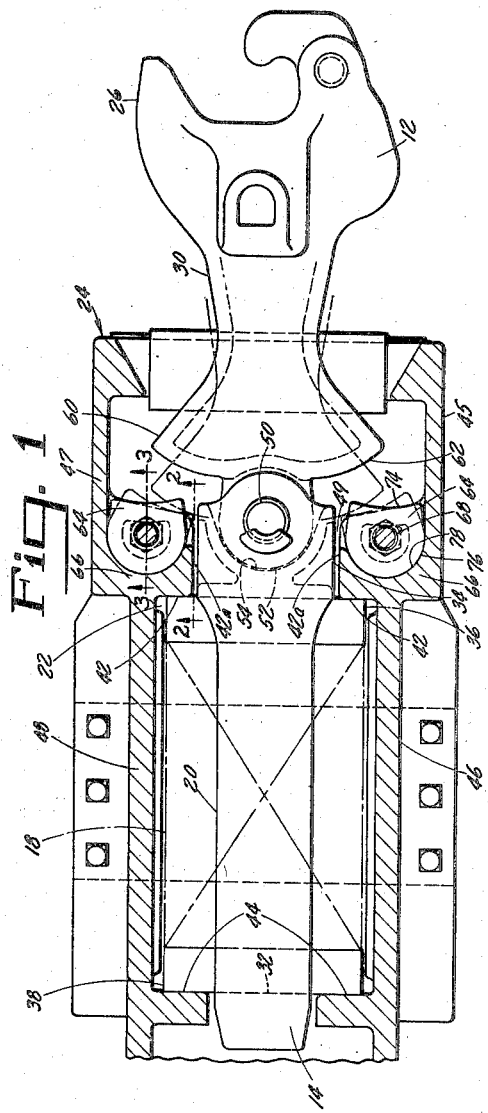
INVENTOR.
WILLIAM J. METZGER
BY Henry Kozak
ATTORNEY April 29, 1958     W. J. METZGER     2,832,476
ALIGNMENT CONTROL MEANS FOR RAILWAY VEHICLES
Filed June 21, 1954     2 Sheets-Sheet 2
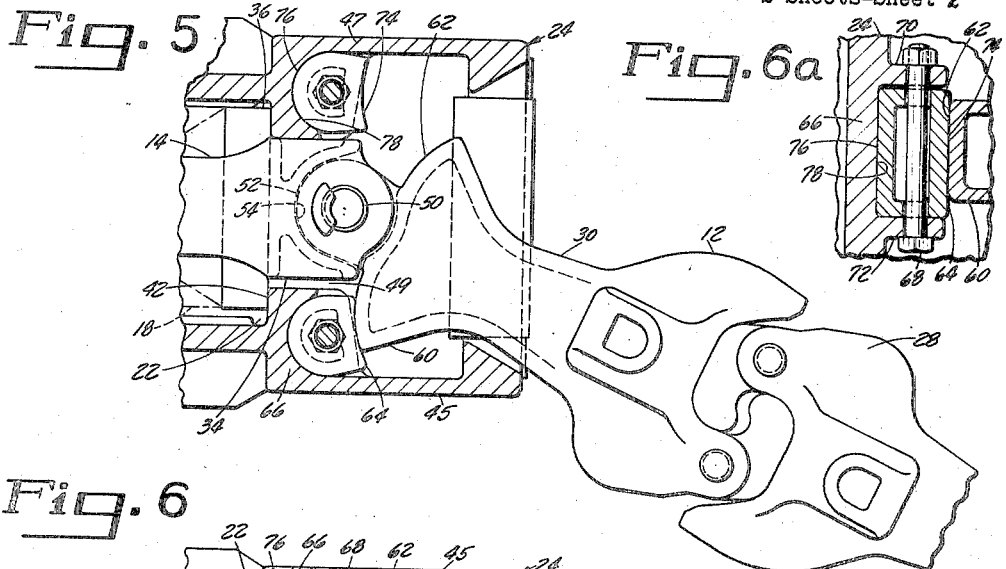
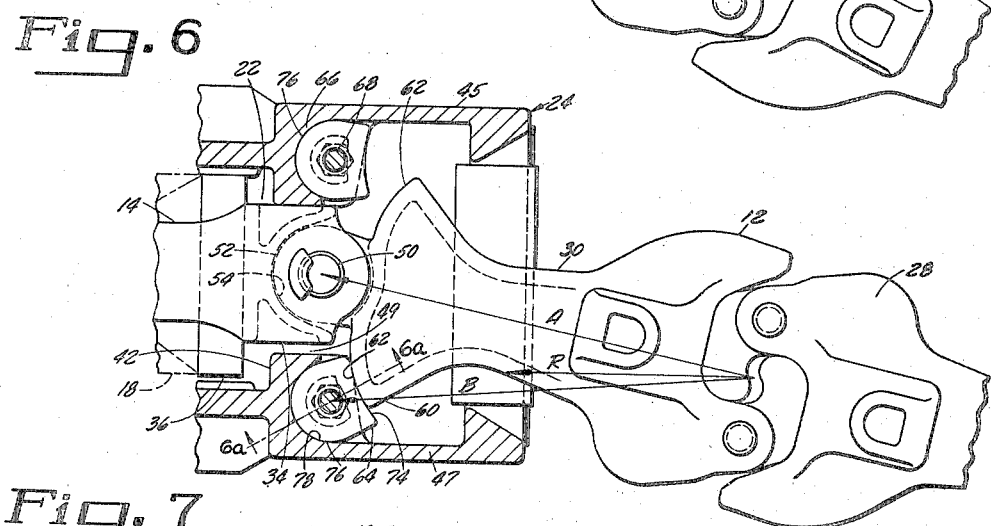
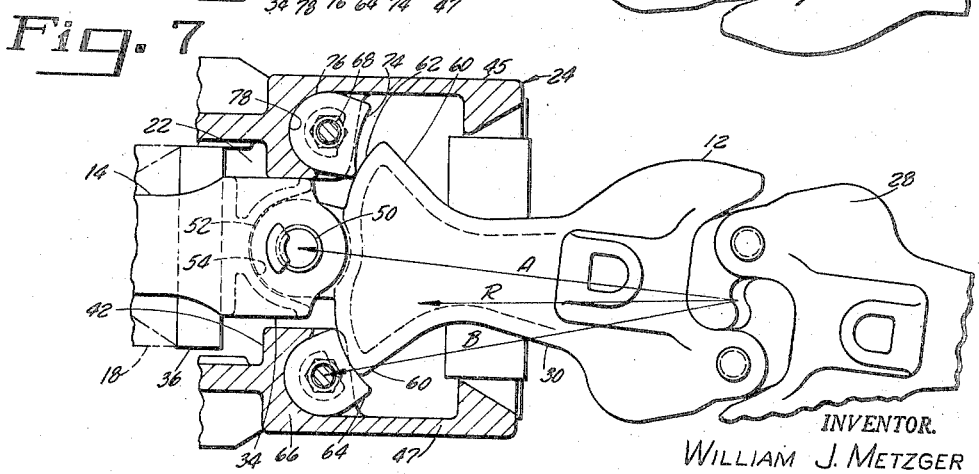
INVENTOR.
WILLIAM J. METZGER
BY
*Henry Kozak*
ATTORNEY United States Patent Office 2,832,476
Patented Apr. 29, 1958

2,832,476

ALIGNMENT CONTROL MEANS FOR RAILWAY VEHICLES

William J. Metzger, East Cleveland, Ohio, assignor to National Malleable and Steel Castings Company, Cleveland, Ohio, a corporation of Ohio Application June 21, 1954, Serial No. 437,993

17 Claims. (Cl. 213—19)

This invention relates to alignment control means for railway vehicles.

Diesel-electric locomotives and similar units and also some railway cars have a relatively long overhang represented by the distance from the center of a car truck to the coupling line of the nearest car coupler. In these cases the longitudinal distance between the truck centers of a unit is usually materially less than that for the average freight car, while the overall length of the unit is substantially greater. On the other hand, the car couplers necessarily have short shanks because of limited horizontal angling conditions resulting from the adjacent motor housings and the like.

This long overhang and short coupler length may cause a condition of lateral misalignment between coupled units or cars during heavy pusher service and also during dynamic braking operations. Such misalignment is aggravated when coupled units pass over a turnout or crossover before entering tangent track and, because of the load being maintained thereon, the units usually continue in misaligned condition on the tangent track. If the misalignment is not corrected, it may result in heated journal bearings, excessive wheel flange and rail head wear and may cause or contribute to derailments.

Attempts have been made, particularly on road locomotives to reduce this misaligning tendency by the use of centering springs acting against each side of the coupler shank. However, because of space limitations, springs of sufficient capacity cannot be used, with the result that misalignment is, at best, only partially controlled. In addition, this type of centering device is objectionable because it renders coupling on curves difficult if not impossible.

My invention corrects these defects and objections by the provision of an alignment control means whereby the coupler shank is provided with lateral projections on opposite sides thereof for engagement with radial seat members pivotally mounted on the underframe of a vehicle. In a modified form of my invention, the coupler shank projections engage rigid abutments also disposed on the underframe. With either construction, proper alignment of the vehicles in service is assured.

Accordingly, the primary object of my invention is to provide an alignment control means which maintains coupled units in substantial alignment yet does not preclude coupling on curves.

A further object is to provide an alignment control means wherein buffing forces from a car coupler are applied to the associated draft gear as well as to pivotally mounted radial seats or rigid abutments on the underframe.

A more specific object of the invention is to provide an alignment control means wherein coupler shank projections engage the car end structure when the coupler under buffing conditions assumes predetermined positions of horizontal angularity.

Other objects and advantages of the invention will be apparent from the following description taken in conjunction with the accompanying drawings, wherein:

Fig. 1 is a plan view in horizontal section of the end structure of a car having my alignment control means embodied therein, the coupler being shown at substantially the midpoint of its free swing, the draft gear being in neutral or unbuffed position. This view also shows in dot-dash the position the coupler assumes when the draft gear is subjected to a substantial force in buff.

Fig. 2 is a partial side elevational view taken along line 2—2 of Fig. 1.

Fig. 3 is a vertical sectional view taken along line 3—3 of Fig. 1.

Fig. 4 is a partial plan view, partly in horizontal section and corresponding to Fig. 1, but showing a modified form of alignment control means. This view also shows in dot-dash the shank of a coupler in a position of angularity at the limit of free coupler swing, the draft gear being unbuffed.

Fig. 5 is a plan view, partly in horizontal section and similar to Fig. 1, showing the coupler horizontally angled at substantially the limit of its free swing, the draft gear being unbuffed.

Fig. 6 is a plan view, showing the functioning of the alignment control means, the draft gear being partially buffed, and the coupler being partially angled from the midpoint of its free swing.

Fig. 6a is a vertical sectional view taken along line 6a—6a of Fig. 6.

Fig. 7 is a plan view, showing the functioning of the alignment control means, the draft gear being substantially buffed and the coupler being angled slightly from the midpoint of its free swing.

Referring to the drawings, there is shown a coupler 12, a yoke 14 to which coupler 12 is connected, and a draft gear 18 encircled by the body 20 of yoke 14 and received in draft gear pocket 22 of end sill structure 24. The coupler 12 comprises a head 26 for mating coupling cooperation with a similar head of an opposing coupler 28 (Figs. 5–7) and a shank 30 integral with head 26.

The yoke 14 comprises the above-mentioned body portion 20 having a transverse opening 32 through which draft gear 18 (shown in dot-dash) extends and a forward head 34 to which coupler shank 30 is pivotally connected.

The draft gear 18 may be of any conventional construction and is here shown as comprised of relatively movable front and rear followers 36 and 38 in engagement with front and rear stop lugs 42 and 44, respectively.

End sill structure 24 is comprised of a forward head portion 45 and a rearwardly extending body portion 46. Head portion 45 includes spaced vertical side walls 47 which are formed integral with spaced vertical side walls 48 of body portion 46 and are continuous therewith. Walls 48 are spaced apart a lesser amount than walls 47 and form draft gear pocket 22 in which yoke 14 is received. Walls 48 also comprise inwardly extending rear stop lugs 44. Forward stop lugs 42 are disposed at the juncture of walls 47 and 48, the inner sides 42a thereof forming a guideway 49 in which yoke head 34 is longitudinally movable.

Coupler shank 30, which is of a short length, is connected at its rearward end to yoke head 34 for the transmission of pushing and pulling forces therebetween and for lateral swinging of the coupler relative to the yoke. Coupler 12 and yoke 14 are pivotally connected by a vertical pin 50.

The rearward end of coupler shank 30 is provided with a substantially cylindrical convex thrust surface 52 which cooperates with a complemental cylindrical concave thrust-receiving surface 54 on yoke head 34. With this construction, buffing forces imparted to the coupler are transmitted directly through surfaces 52 and 54 to draft gear 18, thereby relieving pin 50 of buffing stresses. Buffing forces are applied by yoke 14 to draft gear 18 through front follower 36, from which they are transmitted to rear stop lugs 44 of sill structure 24. Pulling forces applied to coupler 12 are transmitted to yoke 14 through pin 50, and thence by the yoke directly to draft gear 18 and then to front stop lugs 42 of sill structure 24.

The alignment control means is formed in part by lateral thrust projections 60 provided on each side of the rear portion of coupler shank 30, forwardly of pin 50. Projections 60 are provided with rearwardly facing arcuate thrust surfaces 62, which in this instance are convex surfaces. The alignment control means also comprises a thrust transmitting means in the form of a pair of laterally disposed radial seats or abutment members 64, each abutment member being in engagement with a bearing portion 66 in the underframe structure. Abutments 64 are pivotally mounted by means of bolts 68, which extend through top and bottom wall portions 70 and 72 of end sill 24 (Figs. 1, 2 and 3). Each bearing portion 66 is formed at the juncture of walls 47 and 48 and is provided with cylindrical bearing surface 78, which is pivotally engaged by a complemental surface 76 on the rearward side of abutment 64. Each abutment 64 is also provided with a forward thrust-receiving arcuate surface 74 which is complemental to thrust surface 62 on the coupler shank with which it engages as will be hereinafter explained. The center of curvature of surfaces 76 and 78 is preferably located on the axis of bolt 68.

Referring to Fig. 3, it will be noted that retaining holes 80 of abutment member 64 are of a larger diameter than bolt 68 so that rear seat surface 76 of member 64 engages bearing surface 78 of bearing portion 66, the bolt functioning primarily as a retaining means. Thus buffing forces imparted by projections 62 on the coupler shank to members 64 are transferred directly to bearing portions 66, thereby relieving bolt 68 of buffing forces.

Alignment correction is generally effected whenever a substantial buffing force is transmitted through either of coupler shank projections 60 to its corresponding abutment 64. Referring to Fig. 1, wherein the coupler is at the midpoint of its free swing and draft gear 18 is uncompressed, it will be noted that there is substantial clearance between projections 60 and their corresponding abutments 64. Even when the draft gear is fully compressed and the coupler is at the midpoint of its free swing, projections 60 still remain out of aligning contact with abutments 64 as shown in dot-dash. Thus it will be noted that my alignment control means does not restrict the compression of the draft gear under buffing forces imparted thereto by the coupler when the latter is at the midpoint of its free swing. Referring to Fig. 5, it will be noted that a substantial amount of unrestricted horizontal angling of the coupler is provided before projection 60 comes into aligning contact with its corresponding abutment 64. In other words, my alignment control means allows the coupler to be angled to the limit of its free swing when the draft gear is unbuffed. Thus cars equipped with my invention may be coupled with ease on extremely sharp curves.

Operation of the alignment control means will now be described. For the purposes of illustration, reference is made to Fig. 6 which represents a condition of misalignment between adjacent units. In this view, a buffing force is being transmitted from coupler 28 to coupler 12 with the result that coupler 12 is partially angled from the midpoint of its free swing and the draft gear is partially buffed. It will be noted the coupler projection 60 is in engagement with abutment 64. With the parts in this position, abutment 64 receives part of the buffing force, while the balance of the buffing force is applied through the yoke to the draft gear. Thus the buffing force is in part transmitted along the coupler centerline A and in part along line B to seat 64. The net effect is a resultant force R rearwardly directed on a line between pin 50 and abutment 64. The resultant force R is so directed with respect to the center point of the locomotive unit, for example, as to cause the opposing ends of adjacent units to return to substantially aligned position relative to each other. Considering component force A alone, its direction is such as to cause further misalignment of the adjacent units and it will be apparent that without my alignment control means the entire force of the coupler would be directed along line A. However, my invention assures that the resultant force R will be directed along a line which is so related to the center point of the unit as to result in substantial alignment of the units during buffing operations. Under the condition wherein a substantial amount of misalignment of adjacent units exists, abutment 64 will receive a greater portion of the buffing force and therefore resultant R will be directed closer to line B, as shown in Fig. 6. On the other hand, if the misalignment is of a lesser amount the greater portion of the buffing force will be absorbed by the draft gear and therefore resultant R will be directed closer to line A, as shown in Fig. 7, wherein the coupler is slightly angled and the draft gear is substantially buffed.

It will be understood that in connection with the above explanation, Fig. 6 represents the position of the parts when alignment correction commences and Fig. 7 represents a subsequent stage in the alignment correction process. As the alignment process proceeds from Fig. 6 to Fig. 7, the coupler approaches the midpoint of its free swing and resultant R shifts toward coupler centerline A, thereby causing a greater portion of the buffing force to be applied to the draft gear. It will be observed that the draft gear in Fig. 7 is compressed a greater amount than in Fig. 6.

During the aligning operation with projection 60 on the shank in aligning engagement with pivotal abutment 64, as the coupler swings toward central position, abutment 64, simultaneously therewith, rotates relative to bolt 68. This, in effect, results in rotation of the coupler together with abutment 64 relative to bolt 68.

It will be observed, as aforementioned, that whenever coupler projection 60 is in aligning contact with abutment 64, all of the buffing force is transmitted directly through abutment 64 to bearing portion 66, and bolt 68 is free of any buffing forces.

Referring to Fig. 6a, it will be noted that buffing forces are transmitted from coupler shank projection thrust surface 62 to forward surface 74 on abutment 64 evenly over the entire area of contact. Also a full surface contact exists between rear seat surface 76 and bearing portion surface 78. Thus a smooth, even transmission of buffing forces to the center sill is assured. As aforementioned, whenever these two sets of surfaces are in aligning engagement, bolt 68 is relieved of all buffing forces.

In the modification shown in Fig. 4, the rotatable abutments have been replaced by rigid abutments 82 which are integral with side walls 47 of the end sill structure. In all other respects the mechanism is similar to that of the previous embodiment. Abutments 82 are formed with forwardly facing thrust receiving surfaces 84 which preferably taper in a rearward direction. The engagement between thrust surface 62 on projection 60 of the coupler shank and thrust receiving surface 84 on abutments 82 occurs along a substantially vertical line as surface 62 rolls on surface 84 during the alignment process.

It will be apparent that the forward surface 74 of abutment 64 could be made convex and thrust surface 62 on projection 60 concave. When thus modified, the mechanism will operate in the same manner as described in connection with Figs. 5–7.

It will be seen that my invention provides an alignment control means that is simple and economical to manufacture, effective under all service conditions to maintain coupled units under substantial alignment and permits the coupling of cars on even the sharpest curves.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

What I claim is:

1. In a railway car end sill structure, spaced side walls, an abutment member on at least one of said walls, a draft gear disposed between said walls, a yoke encircling said draft gear and a car coupler pivotally connected to said yoke for horizontal angling movement, said coupler comprising a shank having at least one lateral projection generally longitudinally spaced from and being engageable with said abutment when the coupler is in a horizontally angled position.

2. The construction according to claim 1, wherein said abutment members are pivotally mounted on said side walls.

3. In a railway car end sill structure according to claim 2, wherein said abutments have forward arcuate surfaces for engagement with complemental arcuate surfaces on an associated car coupler.

4. In a car end sill structure, alignment control means comprising a pair of transversely spaced abutments on said structure and a car coupler pivotally connected to an associated yoke for horizontal angling movement, said coupler having projections at opposite sides of said pivotal connection spaced generally forwardly of said abutments, said projections being engageable with one or the other of said abutments when said coupler is in predetermined horizontally angled positions and is subjected to a buffing force.

5. In a railway car end sill structure, spaced side walls formed with front and rear draft gear stop lugs to provide a draft gear pocket therebetween, a draft gear in said pocket, a yoke encircling said gear, a car coupler having a shank pivotally connected to said yoke to permit said coupler to angle horizontally relative to said yoke, laterally extending abutments on said walls disposed forwardly of said front stop lugs, and projections on said shank disposed generally forwardly of said abutments, one of said projections being engageable with the corresponding one of said abutments when said shank is angled horizontally a predetermined amount relative to said yoke.

6. In a railway car end sill structure including spaced side walls, alignment control means comprising an abutment on the inner side of each of said walls, said abutments having surfaces extending diagonally rearwardly from said walls, one of said abutments being engageable with an opposing lateral projection on the shank of an associated pivotally mounted car coupler upon predetermined horizontal angling of the coupler.

7. In a railway car end sill structure, spaced side walls, a car coupler having a shank extending between said walls and being pivotally connected to an associated yoke for horizontal angling movement, said shank having rearwardly facing projections on opposite sides thereof, front draft gear stop lugs on said walls, an abutment member on each of said side walls disposed generally intermediate said projections and said lugs, one of said abutment members being engageable with the opposing one of said projections upon predetermined horizontal angling of said coupler.

8. In a railway car end sill structure, spaced side walls, forwardly facing abutments on said walls, a draft gear disposed between said side walls, a yoke encircling said draft gear, a car coupler pivotally connected to said yoke for horizontal angling movement, said coupler comprising a shank, projections on said shank facing said abutments and spaced therefrom to permit substantial horizontal angling of said coupler when said draft gear is unbuffed, one or the other of said abutments being engageable with the corresponding one of said projections when said shank is angled horizontally a predetermined amount and said draft gear is compressed in buff.

9. In a car end sill structure comprising spaced side walls, transversely spaced bearing portions on said walls, each of said portions having an arcuate forwardly facing surface, a pivotal abutment engaging at least one of said bearing portions, said abutment having a forward surface engageable with a complemental surface on the shank of an associated pivotally mounted car coupler upon predetermined horizontal angling of the coupler and also having a rear surface in slidable engagement with said arcuate surface of the corresponding one of said bearing portions.

10. A car end sill structure comprising a body portion and a head portion, said body portion having spaced side walls, said head portion having side walls continuous with and spaced apart a greater amount than said first-named walls, draft gear stops formed at the juncture of said first and second-named walls, bearing portions at said juncture disposed forwardly of said stops, and a rotatable abutment mounted in at least one of said bearing portions, said abutment being engageable with a projection on an associated pivotally mounted car coupler upon predetermined horizontal angling of the coupler.

11. A car end sill structure according to claim 8 comprising top and bottom wall portions, said abutment members being mounted between said wall portions for rotation about a vertical axis.

12. In a railway car end sill structure, spaced side walls, a rigid abutment member on at least one of said walls, a draft gear disposed between said walls, a yoke encircling said draft gear and a car coupler pivotally connected to said yoke for horizontal angling movement, said coupler comprising a shank having at least one lateral projection thereon disposed forwardly of said abutment member and adapted for engagement with the latter when the coupler is in a predetermined horizontally angled position.

13. A railway car end sill structure comprising a body portion and a head portion, said body portion having spaced side walls, said head portion having side walls continuous with and spaced apart a greater amount than said first-mentioned walls, draft stops formed at the juncture of said first and second-mentioned walls, forwardly facing rigid abutment portions formed integrally with said second-mentioned walls and disposed adjacent said stops, one or the other of said abutments being engageable with an opposing rearwardly facing projection on an associated car coupler upon predetermined horizontal angling of the coupler.

14. In a railway car end sill structure having spaced side walls, alignment control means comprising laterally extending rigid abutments on the inner sides of said walls, said abutments having rearwardly tapered surfaces, a car coupler pivotally mounted relative to said structure for horizontal angling, said coupler having lateral projections facing said surfaces and spaced therefrom to enable a limited amount of free angling movement of the coupler, one or the other of said projections being engageable with the opposing one of said surfaces along substantially vertical bearing lines as the coupler is moved from a horizontally angled position toward central position under a buffing load.

15. In a railway vehicle including end sill structure having spaced side walls, fixed abutment means on the inner side of at least one of said walls, a car coupler pivotally mounted on said vehicle generally intermediate said walls for horizontal angling movement, said coupler having at least one laterally extending projection thereon, said projection being generally longitudinally spaced from said abutment means and being engageable therewith upon predetermined horizontal angling of said coupler.

16. A railway car end sill structure in accordance with claim 15 in which said abutment means comprises a laterally extending wall integral with said side wall and having a forwardly facing abutment surface thereon.

17. In a railway vehicle including end sill structure having spaced side walls, alignment control means comprising a rigid abutment on the inner side of at least one of said walls, said abutment having a forwardly facing, rearwardly tapered surface, and a car coupler pivotally mounted on said vehicle generally intermediate said walls for horizontal angling movement, said coupler having at least one laterally extending projection thereon, said projection being generally longitudinally spaced from said abutment and being engageable with the latter upon predetermined horizontal angling of the coupler whereby a force is applied to the corresponding one of said side walls to align the vehicle from a horizontally misaligned position.

References Cited in the file of this patent

UNITED STATES PATENTS

| | | |
|---|---|---|
| 904,712 | McConway | Nov. 24, 1908 |
| 1,150,495 | Buhoup | Aug. 17, 1915 |
| 1,215,315 | Willison | Feb. 6, 1917 |
| 1,311,699 | Kelso | July 29, 1919 |
| 1,648,325 | Regan | Nov. 8, 1927 |

FOREIGN PATENTS

| | | |
|---|---|---|
| 74,003 | Austria | Nov. 10, 1917 |